United States Patent Office 3,504,025
Patented Mar. 31, 1970

---

3,504,025
PROCESS FOR PREPARING ORGANIC THIOPHOSPHORUS COMPOUNDS
Ludwig Maier, Zurich, Switzerland, assignor to Monsanto Chemical Company, St. Louis, Mo., a corporation of Delaware
No Drawing. Filed Nov. 26, 1963, Ser. No. 326,227
Claims priority, application Switzerland, Dec. 1, 1962, 14,134/62
Int. Cl. C07f 9/42
U.S. Cl. 260—543　　　　　19 Claims

ABSTRACT OF THE DISCLOSURE

Process for preparing arylated thiophosphorus compounds of the formula $Ar_mR_nP(S)X_{3-m-n}$ by reacting a compound of the formula $R_nP(S)X_{3-n}$ with an aromatic compound ArH in the presence of a Friedel-Crafts catalyst at a temperature at which hydrogen halide is given off.

---

The present invention relates to a process for preparing organic thiophosphorus compounds of the formula $$Ar_mR_nP(S)X_{3-m-n}$$

wherein Ar is an optional aromatic radical preferably free of non-benzenoid unsaturation (i.e. ethylenic or acetylenic unsaturation) introduced by the reaction, R is preferably free of non-benzenoid unsaturation and an organic radical such as aliphatic, cycloaliphatic, araliphatic or aromatic radical, X is a halogen atom, preferably a chlorine or bromine atom, m is a number having a value of 1, 2 or 3 and n is a number having a value of 0, 1 or 2. When more than one radical Ar, or R respectively, are present, these can be different from each other.

In the prior art is described only the reaction of thiophosphorus chloride with toluene at 130–180° in the presence of a relatively small amount of aluminum chloride ($AlCl_3$), that led to insignificant yields of ditolylthiophosphinic chloride. It is stated that also tolylthiophosphonic chloride is formed (Michaelis, Liebig's Annalen 315, pp. 64–65, 1901). Apart from the inexpedient proportions of the reactants, the work up has been carried out by an exceedingly circumstantial process comprising combined extractions and distillations lasting twice 12 hours, thereby an unattractive residue remained in the apparatus. This process, in which the formation of complex has not been considered between the organic thiophosphorus chlorides formed in the reaction and the catalyst, does not possess any technical importance at all. My investigations have shown that in this well known process the conversion of the thiophosphorus chloride can be at maximum 10–30% and, therefore, even by using the herein proposed novel method of work up the reaction mixture, from the technical point of view, no acceptable yields of desired end products can be obtained.

By systematic examinations of a varied Friedel-Crafts reaction with thiophosphorus chloride and, for example, benzene (Tables 1–4) it has been found that the proportions of all the reactants participating in the reaction are of decisive importance. Although the "analogous" reaction with phosphorus trichloride is better known from the technical literature, it has been found that the methods disclosed therein cannot without modification be applied to the reaction with thiophosphorus chloride, if it is a matter of preparing on a technical scale with good yields defined organic derivatives being substituted to the desired grade. That is, thiophosphorus halides possess other properties than phosphorus halides and, therefore, in this reaction show a wholly different behavior, as will be demonstrated several times hereinbelow.

Under the term "thiophosphorus halide compounds" used as starting compounds is understood throughout this specification any compound corresponding to the formula $$R_nP(S)X_{3-n}$$

In this formula R is as defined hereinabove, which can contain substituents inert towards aluminum chloride, such as chlorine, bromine, iodine, fluorine, $NO_2$, $SO$, $SO_2$, radicals derived from secondary amines, ether groups (RO) and ester groups (OCOR) as further possible substituents, etc. X represents a halogen atom. Generally, it is a chlorine or bromine atom. The symbol n represents a value of 0, 1 or 2. Thus, in the starting compounds up to two radicals R can be present and, in such a case they can be identical or different from one another.

The simplest thiophosphorus halide compound is the thiophosphorus halide itself, in which by the instant process can be exchanged, two or all three halogen atoms for optional aryl radicals fit to the Friedel-Crafts reaction.

The simplest organic thiophosphorus halide compounds are the thiophosphonic dihalides and thiophosphinic halides. All compounds pertaining to these classes can successfully be used in the instant reaction, as far as they can be prepared and are enough stable. They can be prepared (with some exceptions) according to the process disclosed herein or according to one of the numerous other processes found in the technical literature. In general, thiophosphinic halides and thiophosphonic dihalides are used for the preparation of thiophosphinic halides or triorganophosphine sulfides having different substituents. Radicals attached to the phosphorus can be e.g. methyl, ethyl, n-propyl, iso-propyl, n-butyl, isobutyl, tert-butyl, amyl, heptyl, octyl, stearyl, benzyl, cuminyl, phenylethyl, cyclopentyl, cyclohexyl, phenyl, xylyl, mesityl, cumyl, benzylphenyl, diphenyl, naphthyl, anthryl, phenanthryl, indanyl, indenyl, etc. Such radicals, as far as it is possible, may contain substituents, such as in the radicals, e.g. chloromethyl, dichloromethyl, trichloromethyl, chloroethyl, perchloroethyl, chlorophenyl, 1,4-dichlorophenyl, 1,2-dichlorophenyl, 1,2,3-trichlorophenyl, 1,2,4-trichlorophenyl, etc.; the corresponding bromine and fluorine analogues; or the analogues containing a combination of different halogens; moreover, nitrophenyl, dimethylaminophenyl etc. Normally R will not have more than 25 carbon atoms although obviously the process of the invention is operable when R has more than 25 carbon atoms, and especially desirable reactants are those wherein R has not more than 8 carbon atoms.

The reaction on which the present invention is based may be represented by the following scheme:

$$R_nP(S)Cl_{3-n} + mArH \xrightarrow{AlCl_3-catalyst} Ar_mR_nP(S)Cl_{3-n-m} + mHCl$$

thereby m can have the value of 1–3 corresponding to the number of chlorine atoms which have been replaced.

The aromatic compounds ArH utilizable for the process, in particular comprise the following compounds and classes of compounds: benzene and alkylated benzenes (e.g. toluene, xylene, trimethylbenzenes, propylbenzenes, hexylbenzenes, dodecylbenzenes), arylated benzenes (e.g. diphenyl, terphenyl, quaterphenyl, triphenylmethane, diphenylmethane, tetraphenylmethane) and polynuclear aromatic hydrocarbons (e.g. naphthalene, tetrahydronaphthalene, anthracene, phenanthrene), i.e. ArH will normally not have more than 25 carbon atoms, however obviously the process of the invention is operable when ArH contains more than 25 carbon atoms, and especially desirable ArH's are those having not more than 8 carbon atoms. These aromatic compounds can possess optional substituents, e.g. halogen, secondary amine groups, etc.

such as are also allowed in the common Friedel-Crafts reaction.

It is an object of the present invention to prepare triorganophosphine sulfides. No process existed up to now which would make possible the manufacture of this class of valuable compounds on a technical scale. It was found that for example triphenylphosphine sulfide can be prepared in a pure form and with good yields, when the molar proportion of the necessary reactants $$P(S)Cl_3:AlCl_3:ArH$$

is at least 1:3:3, i.e. when per mole of thiophosphorus chloride at least 3 moles of aluminum chloride and 3 moles of benzene are employed. Preferably some more AlCl₃ is engaged, e.g. 3.33 moles. The increase of the quantity of benzene does not further influence the yield. Thus, the aryl compounds to be reacted can simultaneously serve as a solvent or diluent, as far as they will be liquid at the reaction temperature.

Starting with thiophosphorus chloride and benzene there are obtained at a reaction temperature of e.g. about 80° (i.e. boiling point of benzene) after 7–9 hours about 85–100% yield of triphenylphosphine sulfied. The conversion of thiophosphorus chloride being 85% and more.

In contrast to this, the proportions $P(S)Cl_3:AlCl_3:ArH$ hitherto employed according to the technical literature for the tolylation of thiophosphorus chloride, have been such as 1:0.18:1.8–2.2. Own experiments have shown that no essential quantities of tritolylphosphine sulfide are formed under these conditions.

Also the proportions employed up to now for the arylation of phosphorus trichloride have about the same order of magnitude. The following ratios of $$PCl_3:AlCl_3:ArH$$

have been proposed: 1:0.2–0.33:0.33, 1:0.33:0.25, and 1:0.25:1. Finally, it has been assumed that an amount of aluminum chloride which exceeds somewhat ⅓ of the molar proportion of the aromatic reactant would be sufficient (B. Buchner and L. B. Lockhart, J., Organic Syntheses 31, 88, 1951). Since the aluminum chloride has always been employed up to now only in fractions of a mole with respect to a mole of the phosphorus trichloride (or in one case of the thiophosphorus chloride) engaged, it was not evident that by using a multiple of a mole of the catalyst, i.e. 3 moles at least, this would lead to excellent yields of triarylphosphine sulfides, inasmuch as the same reaction with phosphorus trichloride does not lead to triarylphosphines. According to own investigations these are not at all available by the Friedel-Crafts reaction. Even if the aromatic component is increased up to the theoretically necessary amount, i.e. up to 3 moles (or more) in the proportions which have been proposed in the prior art, the yields of triarylphosphine sulfides nevertheless remain below 10%, and also by increasing now the aluminum chloride component up to 2 moles, still no acceptable yields of triarylphosphine sulfides can be obtained. The need of a 10–15 fold increase of the catalyst quantity was not at all obvious with respect to the quantity used till now. Therefore, there is no doubt that the perception disclosed herein will enrich the art of today.

Another object of the instant invention is the preparation of diorganothiophosphinic halides. It has been found that diphenylthiophosphinic chloride, as an example, is obtainable with an almost quantitative yield, if under observation of an expedient reaction temperature and reaction time, the molar proportions of the reactants $P(S)Cl_3:AlCl_3:ArH$ are equal to 1:1–2:2, i.e. per mole of thiophosphorus chloride at least 1 mole of aluminum chloride and 2 moles of benzene are employed. Preferably some more catalyst, for example 1.1–2 moles is employed. In this reaction the increase of the benzene quantity also has no influence over the yield and therefore the aryl compound to be reacted can serve simultaneously as a solvent or diluent, as long as it will be liquid at the reaction temperature. One obtains from thiophosphorus chloride and benzene after 2 hours at 80° about 90–100% diphenylthiophosphinic chloride, thereby the conversion of the thiophosphorus chloride is in the order of 90% and more. If for comparison the same reaction is carried out using a ratio of the reactants used up to now, the conversion of the thiophosphorus chloride is hardly more than about 20% (Table 4), regardless of whether the reaction mixture is heated for a short or long period at 130–180° (or at 80°, as proposed herein). In this connection it may be noted, that the reaction period used earlier in the preparation of diarylchlorophosphines from phosphorus trichloride and aromatic compounds in the presence of relatively small amounts of aluminum chloride have been 30–40 hours.

It is assumed—own investigations have proved this—that the diarylchlorophosphines are formed by redistribution of aryldichlorophosphines. The presence of a small quantity of aluminum chloride is needed hereto.

In contrast to this, the arylthiophosphonic dichlorides are not able to such a redistribution and no analogy in the reaction is apparent. Di- and triaryl derivatives are formed exclusively by exchange of halogen atoms for aryls. For this reason, it is also possible by the modified version of the Friedel-Crafts reaction to make such compounds which possess, linked via a carbon atom to the phosphorus, 2 or 3 different aryls, or optional organic radicals of which at least one is an aryl group, respectively.

Still a further object of the invention is the preparation of arylthiophosphonic dihalides. It has been found that on the basis of the optimum conversion of the thiophosphorus chloride, the best yields of, for example, phenylthiophosphonic dichloride are obtained, when maintaining an expedient reaction temperature and reaction time, the molar proportion $P(S)Cl_3:AlCl_3:ArH$ corresponds to 1:2:1, i.e. per mole of thiophosphorus chloride at least 2 moles of aluminum chloride (or other suitable catalysts) and at maximum 1 mole of benzene are employed. A further increase of the aluminum chloride has no essential influence on the course of the reaction and brings no advantages. Starting with thiophosphorus chloride and benzene there is obtained after ¼ hour at 80° a mixture consisting of about equal quantities of phenylthiophosphonic dichloride and diphenylthiophosphinic chloride besides a small quantity of triphenylphosphine sulfide (2–4%), the conversion of the thiophosphorus chloride being about 65% and more (Table 3).

It has further been found, when the corresponding bromides instead of the chlorides are used, the yield of an arylthiophosphonic dihalide can considerably be increased with respect to the diarylthiophosphinic halide which as a rule is formed simultaneously. From thiophosphorus bromide and benzene, as an example, there is obtained after ½ hour at 80° in the presence of aluminum bromide and maintaining the proposed ratio of 1:2:1 a mixture of phenylated products consisting of 88% of phenylthiophosphonic dibromide and only 12% of diphenylthiophosphinic bromide. The conversion of the thiophosphorus is 50% and more. Aluminum chloride can also be used as a catalyst in this reaction giving a similar result.

Although other catalysts, known to promote the Friedel-Crafts reaction, such as zirconium tetrachloride, chromium trichloride etc. would also be fit to the reaction of the invention, they would not bring any advantage over the cheaper aluminum chloride.

It has surprisingly turned out that organic aluminum dihalides, e.g. alkylaluminum dihalides such as ethylaluminum dichloride, are well suited catalysts and strongly promote the formation of monoaryl derivatives. A mixture comprising a trialkylaluminum and aluminum chloride in a molar ratio of 1:2 can also be used, after it has been subjected to redistribution in the usual manner.

The reaction is performed in a simple manner by mixing the reactants and heating until no more substantial quantity of hydrogen chloride is evolved. The reaction time and temperature depend on the reactivity of the aromatic compound to be reacted and on the desired grade substitution. One can work with or without a solvent. Such solvents are appropriate which do not react with the reactants under the conditions employed. Examples are: aliphatic hydrocarbons such as light petroleum, hexane, octane etc.; cycloaliphatic hydrocarbons such as cyclohexane, etc.; hydroaromatics such as Decalin, etc.; halogenated aliphatic hydrocarbons such as methyldichloride, carbon tetrachloride, 1,2-dichloroethane, etc.; moreover, nitrobenzene, carbon disulfide, etc.

In the preparation of di- and triaryl derivatives, or if the starting compound contains only 1 or 2 halogen atoms to be exchanged, respectively, an excess of the aromatic compound to be reacted can conveniently be used as a solvent if it is liquid at the reaction temperature.

It may be noted that the process of invention, i.e. the arylation of thiophosphorus compounds, can also be conducted in a vapor phase instead of a liquid phase.

In the work up of the reaction mixture, the complexes formed by the endproducts and aluminum halide have to be decomposed in any case. This decomposition can be achieved by addition of an equivalent amount of an alkali chloride or any other compound forming a stronger complex with the aluminum halide than the endproducts to be isolated. It has been found in the preparation of triarylphosphine sulfides, or tertiary phosphine sulfides respectively, that about 30–35% of the aluminum chloride used can be recovered, when to the tertiary phosphine sulfide-AlCl$_3$ complex an appropriate quantity of an halogenated aliphatic solvent, such as CH$_2$Cl$_2$, ClCH$_2$CH$_2$Cl, added. A part of the aluminum chloride separates and can be removed by filtration or centrifuge, whilst the complex compound remains in solution. Moreover, the aluminum chloride can be separated and filtered off in the form of the hydrate by addition of the calculated quantity of water i.e. 3 moles of water per mole of aluminum chloride. It has been found, contrary to the corresponding 3-valent phosphorus compounds, that the reaction mixture can also be decomposed by water (or hydrochloric acid). Ice or cooling brine is expediently used hereto in the preparation of mono- and dihalides. In order to effect a better separation of the layers, a solvent can be added if not already present. The separated endproducts in the most cases are distillable. It is clear that the halogen-containing endproducts can also be isolated after hydrolysis in the form of free thiophosphonic acids or thiophosphinic acids or after alcoholysis or aminolysis in the form of esters or amides, or can further be worked up otherwise.

EXAMPLE 1

A mixture containing 50.7 g. (=0.3 mole) of PSCl$_3$, 133 g. (=1 mole) of AlCl$_3$ and 150 g. (=1.92 mole) of C$_6$H$_6$ is refluxed in a two-necked flask equipped with a reflux condenser and a stirrer. HCl-evolution starts immediately and the color of the mixture turns yellow. After 8 hours refluxing HCl-evolution ceases. The color of the reaction mixture is now dark brown. The reaction mixture is poured onto ice, the organic layer separated and the aqueous layer extracted three times with benzene. The benzene extracts are dried over Na$_2$SO$_4$ and then benzene is distilled off. One obtains 91 g. of crude triphenylphosphine sulfide, M.P. 145–158°, which, after two times recrystallization from acetone/water, melts at 158–158.5°. Yield of pure product is 75.5 g. (=85.8%) (calculated on P(S)Cl$_3$). Chemical shift in the CHCl$_3$ solution −43.5 p.p.m. (with H$_3$PO$_4$ as reference).

The IR spectrum is superimposable to that of an authentic sample.

*Analysis.*—Calc. for C$_{18}$H$_{15}$PS (294.3), percent: C, 73.44; H, 5.14; S, 10.89. Found, percent: C, 73.11; H, 5.52; S, 11.08.

EXAMPLE 2

A mixture containing 50.7 g. (=0.3 mole) of P(S)Cl$_3$, 80 g. (=0.6 mole) of AlCl$_3$ and 94 g. (=1.2 mole) of benzene is refluxed in a two-necked flask equipped with a reflux condenser and a stirrer. HCl evolution starts immediately. After a short period one obtains a clear, yellow to brown colored solution. HCl evolution ceases after about ½ hour. The voltatile components are distilled off under reduced pressure and collected in a cooled trap. By fractional distillation of the contents in the cooled trap 44 g. of benzene and 1 g. of PSCl$_3$ are recovered. The distillation residue is hydrolyzed by pouring onto ice, extracted with benzene, the benzene extracts dried over Na$_2$SO$_4$ and fractionally distilled. One obtains 63.7 g. (=85.8%) of diphenylthiophosphinic chloride, B.P. 147–8°/0.005 mm. Hg, $n_D^{20}$=1.6618, chemical shift −79.3 p.p.m.

*Analysis.*—Calc. for (C$_{12}$H$_{10}$ClPS (252.5), percent: Cl, 14.1. Found, percent: Cl, 14.02.

From the distillation residue 7.3 g. (=8.4%) of triphenylphosphine sulfide have been isolated.

With a ratio of P(S)Cl$_3$:AlCl$_3$:C$_6$H$_6$=1:1:4 heating for 1½ hours is necessary until HCl evolution ceases. Using 50.7 g. of P(S)Cl$_3$ the fraction distillation yields besides unchanged P(S)Cl$_3$ (3 g.) and benzene (45.2%), 60.1 g. (=84.7%) of diphenylthiophosphinic chloride. From the distillation residue 4.6 g. of triphenylphosphine sulfide have been isolated, M.P. 157°.

EXAMPLE 3

A mixture of 50.7 g. (=0.3 mole) of P(S)Cl$_3$, 80 g. (=0.6 mole) of AlCl$_3$ and 23.5 g. (=0.3 mole) of benzene is refluxed in a two-necked flask equipped with a stirrer and reflux condenser. HCl-evolution starts immediately and the color of the mixture turns yellow. After ¼ hour HCl evolution ceases. The volatile components are now distilled off under reduced pressure and collected in a cooled trap. Redistillation of the contents of the cooled trap yields 1.5 g. of benzene and 10 g. of P(S)Cl$_3$. The residue of the distillation is hydrolyzed by pouring onto ice, extracted with benzene, the benzene extracts dried over Na$_2$SO$_4$ and then fractionally distilled. One obtains (1) 23 g. (=45.3%) C$_6$H$_5$P(S)Cl$_2$, B.P. 72–75°/0.05 mm. Hg, $n_D^{20}$=1.6227, chemical shift −74.8 p.p.m.
(2) 20 g. (32.9%) of (C$_6$H$_5$)$_2$P(S)Cl, B.P. 147–8°/0.05 mm. Hg
(3) 3 g. (=4.2%) as distillation residue from which triphenylphosphine sulfide has been isolated.

With the ratio of P(S)Cl$_3$:AlCl$_3$:benzene=1:0.191:2.08, used by Michaelis (A. Michaelis, Ann. 315, 43, 1901), I obtained after 7½ hours reflux (HCl evolution ceased nearly completely after 1½ hours) a 23.6% conversion of P(S)Cl$_3$ with the formation of 1.7% of PhP(S)Cl$_2$, 20.4% of Ph$_2$P(S)Cl, and 1.5% of Ph$_3$PS. The mixture, however, was worked up according to the process of my invention.

EXAMPLE 4

A mixture of 51 g. (0.3 mole) of P(S)Cl$_3$, 133 g. (=1 mole) of AlCl$_3$ and 184 g. (=2 moles) of toluene and 100 ml. of hexane is refluxed for 8¾ hours. HCl evolution starts immediately, but ceases nearly completed after ¾ hour. The color of the reaction mixture is first yellow and turns then to red. The reaction mixture is hydrolyzed by pouring onto ice, extracted 3 times with 200 ml. of toluene each. The toluene extracts are dried over Na$_2$SO$_4$ and then carbon black is added. After filtration excess toluene is distilled off at reduced pressure. One obtains 116 g. of a red oily residue, from which p-tritolylphosphine sulfide crystallizes out on standing at room temperature. The crystals are filtered off, and are recrystallized first from acetic acid and then from petroleum ether. One obtains 23 g. (22.9%) of pure para-tritolylphosphine sulfide;

M.P. 181–182° C., chemical shift (dissolved in benzene) −41.1 p.p.m.

Analysis.—Calc. for $C_{21}H_{21}PS$ (336.4), percent: C, 74.97; H, 6.29; S, 9.21. Found, percent: C, 75.22; H, 6.28; S, 9.24.

The infrared spectrum shows that more than 90% is the p-isomer.

The filtrate is fractionally distilled. One obtains (1) 2.3 g. of a forerun, B.P. 50–5° C./0.05 mm.
(2) 7.0 g. consisting of $CH_3C_6H_4P(S)Cl_2$ and $(CH_3C_6H_4)_2P(S)Cl$ B.P. 103–130°/0.15 mm.
(3) 27.4 g. consisting of $(CH_3C_6H_4)_3PS$ and traces of $(CH_3C_6H_4)_2P(S)Cl$; B.P. 220–250°/0.3 mm., chemical shift −41.2 p.p.m. Chlorine content: 1.48%.
(4) 29.3 g. (=29%) of the o, m, and p isomers of tritolylphosphine sulfide; B.P. 296–310° C./0.4 mm., chemical shift −42.7.

Thus, the total yield of tritolylphosphine sulfide is 79.7 g. (=79%).

EXAMPLE 5

Following the same procedure as in Example 4 there are obtained from 50.7 g. (0.3 mole) thiophosphorus chloride, 80 g. (0.6 mole) aluminum chloride and 100.5 g. (1.2 mole) toluene after about 1 hour:

(1) 62.1 g. (=73.5%) of crude $(CH_3C_6H_4)_2P(S)Cl$, viscous, brown liquid, B.P. 180–235°/0.2 mm. extract with petroleum ether, M.P. 95°
(2) 19.6 g. of a residue The conversion of $P(S)Cl_3$ is 73.5%.

With the ratio of $P(S)Cl_3$:$AlCl_3$:toluene=1:0.191:2.08, used by Michaelis (loc. cit.), I obtained after 7 hours reflux a 30% conversion of $P(S)Cl_3$ with the formation of 4% of $CH_3C_6H_4P(S)Cl_2$, 15.4% of $(CH_3C_6H_4)_2P(S)Cl$, and 10.6% of $(CH_3C_6H_4)_3PS$. The mixture, however, was worked up according to the process of my invention.

EXAMPLE 6

Following the same procedure as in Example 4, from 50.7 g. (0.3 mole) of thiophosphorus trichloride, 100 g. (0.75 mole) of aluminum chloride and 27.6 g. (0.3 mole) of toluene, there are obtained after refluxing for about ¼ hour:

(1) 7.2 g. (=10.5%) $CH_3C_6H_4P(S)Cl_2$, B.P. 85–7°/0.05 mm., $n_D^{20}$ 1.6130; chemical shift −74.1 p.p.m. Analysis.—Calc. for $C_7H_7Cl_2PS$ (225.8), percent: C, 37.35; H, 3.14; Cl, 31.50. Found, percent: C, 37.46; H, 3.31; Cl, 31.20.
(2) 5 g. of a middle fraction; B.P. 90–165° C./0.02 mm.
(3) 9.6 g. (=21.4%) of $(CH_3C_6H_4)_2P(S)Cl$, B.P. 166–70°/0.1 mm., $n_D^{20}$ 1.6499; chemical shift −79.7 p.p.m. Chlorine content calc. 12.63%, found 12.91%.
(4) 25.6 g. of a dark-brown glassy distillation residue.

EXAMPLE 7

Following the same procedure as in Example 1, from 50.7 g. (0.3 mole) of $P(S)Cl_3$, 212 g. (1.6 moles) of $AlCl_3$ and 225 g. (2 moles) of chlorobenzene after 7 hours, there are obtained: 125 g. of a reddish solid product; M.P. 110–135°. After recrystallization three times from acetone/water one obtains tri(chlorophenyl)phosphine sulfide, M.P. 146–147°. Yield 76 g. (=64% based on the thiophosphorus chloride employed). Chemical shift (dissolved in $C_6H_6$) −40.2 p.p.m.

Analysis.—Calc. for $C_{17}H_{12}Cl_3PS$ (397.7), percent: C, 54.36; H, 3.04; Cl, 26.75; S, 8.06; P, 7.79. Found, percent: C, 54.50; H, 3.42; Cl, 26.45; S, 8.22; P, 7.50.

The IR-spectrum indicates that the product is a mixture of about equal parts of the ortho- and the para-isomer. Contrary to the reaction with $PCl_3$, no m-isomer is formed.

EXAMPLE 8

Following the same procedure as in Example 4, from 50.7 g. (0.3 mole) of thiophosphorus chloride, 80 g. (0.6 mole) of aluminum chloride and 135 g. (1.2 mole) chlorobenzene after refluxing for about 1¼ hours, there are obtained:

(1) 63.4 g. $(ClC_6H_4)_2P(S)Cl$, B.P. 180–210°/0.1 mm. This liquid crystallizes completely. Recrystallization from petroleum ether, M.P. 100–101°. Yield 61 g. (=63.2%). Chemical shift (in benzene) −75.1 p.p.m.

Analysis.—Calc. for $C_{12}H_8Cl_3PS$ (321.6), percent: C, 44.81; H, 2.51; Cl, 33.08. Found, percent: C, 44.78; H, 2.42; Cl, 32.82.

(2) 24.9 g. of distillation residue, which precipitates from alcohol as a dark-red oil and constitutes probably an isomeric mixture of tris(chlorophenyl)phosphine sulfide.

EXAMPLE 9

Following the same procedure as in Example 4, from 50.7 g. (0.3 mole) of thiophosphorus chloride, 100 g. (0.75 mole) of aluminum chloride and 33.7 g. (0.3 mole) of chlorobenzene after refluxing for about 1 hour, there are obtained:

(1) 33 g. (=45.4%) $ClC_6H_4P(S)Cl_2$, B.P. 86–90°/0.02 mm., $n_D^{20}$ 1.6360; chemical shift −68.7 p.p.m.

Analysis.—Calc. for $C_6H_4Cl_3PS$ (245.5), percent: C, 29.35; H, 1.64; Cl, 43.33. Found, percent: C, 29.14; H, 1.68; Cl, 43.11.

(2) 9 g. (=19.7%) of $(ClC_6H_4)_2P(S)Cl$, B.P. 150–60°/0.02 mm. M.P. 96–98° C. (mixture of isomers).
(3) 13.5 g. (=18.3%) $(ClC_6H_4)_3PS$.

EXAMPLE 10

Following the same procedure as in Example 4, from 11 g. (0.077 mole) of methylethylthiophosphinic chloride, 20 g. (0.15 mole) of aluminum chloride and 31 g. (0.4 mole) of benzene, after about 1 hour there are obtained:

(1) 3.5 g. of the starting product B.P. 85–7°/0.2 mm.
(2) 8 g. of $CH_3(C_2H_5)(C_6H_5)PS$, B.P. 108–10°/0.2 mm. (=83.0%), $n_D^{20}$ 1.5996; chemical shift −45.8 p.p.m.

Analysis.—Calc. for $C_9H_{13}PS$ (184.17), percent: C, 58.69; H, 7.11; S, 17.41. Found, percent: C, 58.46; H, 7.44; S, 17.62.

EXAMPLE 11

Following the same procedure as in Example 4, from 50 g. (0.33 mole) of methylthiophosphonic dichloride, 112 g. (0.84 mole) of aluminum chloride and 105 g. (1.35 mole) of benzene, after about 6 hours there are obtained 63 g. (=81.3%) of diphenylmethylphosphine sulfide, B.P. 157–9°/0.1 mm. Hg, $n_D^{20}$ 1.6533, chemical shift −35.5 p.p.m. This compound is a new compound which possesses a high boiling point and low melting point as compared to closely related compounds of the prior art.

Analysis.—Calc. for $C_{13}H_{13}PS$ (232.27), percent: C, 67.22; H, 5.64; S, 13.80. Found, percent: C, 67.03; H, 6.06; S, 14.31.

EXAMPLE 12

Following the same procedure as in Example 4, from 45 g. (0.33 mole) of methylthiophosphonic dichloride, 44 g. (0.33 mole) of aluminum chloride and 105 g. (1.35 mole) of benzene, after about ½ hour there are obtained:

(1) 48.1 g. (=76.8%) $CH_3(C_6H_5)P(S)$ Cl; B.P. 93–4°/0.03 mm., $n_D^{20}$ 1.6175; chemical shift 81.8 p.p.m.

Analysis.—Calc. for $C_7H_8ClPS$, percent: C, 44.10; H, 4.23. Found, percent: C, 44.23; H, 4.42.

(2) 4.2 g. (=5.2%) of $CH_3(C_6H_5)_2PS$ as a residue.

EXAMPLE 13

Following the same procedure as in Example 4, from 50.7 g. (0.3 mole) of thiophosphorus chloride, 133 g. (1 mole) of aluminum chloride and 175 g. (1 mole) of hexyltoluene, after about 6 hours there is obtained a fraction distilling continuously in the range of 235–320°/0.5 mm.

Yield 87 g. The P³¹ NMR-analysis indicates that it consists of about 30% of di(hexyltolyl)thiophosphinic chloride (chemical shift −75.2 p.p.m.) and 70% of tri(hexyltolyl) phosphine sulfide (chemical shift −41.0 p.p.m.).

EXAMPLE 14

Following the same procedure as in Example 4, using a mixture of P(S)Br₃:AlBr₃:C₆H₆=0.3:0.6:0.3 mole, after refluxing for 15 minutes there are obtained:

(1) 40.1 g. (=44.5%) of C₆H₅P(S)Br₂, B.P. 88.5–90°/ 0.001 mm., $n_D^{20}$ 1.6968; chemical shift −19.8 p.p.m.

*Analysis.*—Calc. for C₆H₅Br₂PS, percent: C, 24.02; H, 1.68. Found, percent: C, 24.21; H, 1.94.

(2) 5.4 g. (=6.1%) of impure (C₆H₅)₂P(S)Br; B.P. 155–7° C./0.01 mm.; $n_D^{20}$ 1.6939; chemical shift −64.4 p.p.m.

Thus, the whole distillate in this case consists of 88% of phenylthiophosphonic dibromide and 12% of diphenylthiophosphinic bromide.

In the following Tables 1–4 are compiled the results of further experiments. The same working processes are used as in the Example 1 or 4. The total yields of phenylated products are calculated on the basis of thiophosphorus chloride and benzene consumed, i.e. quantity employed minus quantity recovered. In the experiments where hexane is added, two layers are present at the end of the reaction.

In all the experiments the reaction temperature is 80°. In the runs 15 and 16 are added 300 ml. of hexane per mole of thiophosphorus chloride. The yields of crude products are in each case more than 95%. The yields mentioned are obtained by recrystallization once from acetone/water.

The phenylated reaction products consist of 100% of triphenylphosphine sulfide.

TABLE 2

| Example No.: | Molar ratio, P(S)Cl₃:AlCl₃:C₆H₆ | Time, hrs. | Yield in percent calculated on— | | Conversion in percent calculated on— | |
|---|---|---|---|---|---|---|
| | | | P(S)Cl₃ | C₆H₆ | P(S)Cl₃ | C₆H₆ |
| 18 | 1:1:2 | ¾ | 87.0 | 96.3 | 70.2 | 71.7 |
| 19 | 1:1:3.33 | 7 | 93.0 | -------- | 82.6 | -------- |
| 20 | 1:1.1:3.33 | ¾ | 99.5 | 78.3 | 74.2 | 44.9 |
| 21 | 1:1:4 | 1½ | 90.2 | 83.8 | 84.6 | 43.4 |
| 22 | 1:1.1:6.6 | 2 | 97.9 | 83.7 | 92.6 | 27.5 |
| 23 | 1:1.1:13.2 | 4½ | 90.2 | 72.9 | 90.2 | 14.5 |
| 24 | 1:2:2 | ½ | 90.1 | 91.3 | 89.1 | 88.5 |
| 25 | 1:2:4 | ½ | 94.2 | 92.0 | 92.4 | 48.0 |
| 26 | 1:2:4 | 9 | 94.5 | 97.0 | 94.5 | 53.5 |
| 27 | 1:3:2 | ¼ | 93.0 | 86.5 | 80.5 | 84.5 |
| 28 | 1:3:4 | ¼ | 95.0 | 83.2 | 91.0 | 47.8 |

The reaction temperature is 80°, except run 27 where it is 80–110°. In the run 19 are added 300 ml. of hexane, per mole of thiophosphorus chloride. The composition of the phenylated reaction products is:

| | Composition of Matter in Percent | | |
|---|---|---|---|
| | PhP(S)Cl₂ | Ph₂P(S)Cl | Ph₃PS |
| Example No.: | | | |
| 18 | 1.3 | 91.3 | 7.4 |
| 19 | | 96.7 | 3.3 |
| 20 | 1.8 | 93.0 | 5.2 |
| 21 | | 92.9 | 7.1 |
| 22 | | 91.6 | 8.4 |
| 23 | | 87.7 | 12.3 |
| 24 | 7.0 | 84.2 | 8.8 |
| 25 | | 89.8 | 10.2 |
| 26 | | 78.4 | 21.6 |
| 27 | 1.3 | 84.3 | 14.4 |
| 28 | | 88.4 | 11.6 |

TABLE 1

| Example No.: | Molar ratio, P(S)Cl₃:AlCl₃:C₆H₆ | Time, hrs. | Yield in percent calculated on— | | Conversion in percent calculated on— | |
|---|---|---|---|---|---|---|
| | | | P(S)Cl₃ | C₆H₆ | P(S)Cl₃ | C₆H₆ |
| 15 | 1:3.33:3.33 | 9 | 70.0 | -------- | 70.0 | -------- |
| 16 | 1:3.33:6.4 | 8 | 85.8 | -------- | 85.8 | -------- |
| 17 | 1:5.33:4 | 9 | 76.2 | -------- | 76.2 | -------- |

TABLE 3

| Example No.: | Molar ratio, P(S)Cl₃:AlCl₃:C₆H₆ | Time, hrs. | Yield in percent calculated on— | | Conversion in percent calculated on— | |
|---|---|---|---|---|---|---|
| | | | P(S)Cl₃ | C₆H₆ | P(S)Cl₃ | C₆H₆ |
| 29 | 1:1:1 | ½ | 94.2 | 98.3 | 53.0 | 91.6 |
| 30 | 1:2:1 | ¼ | 82.4 | 100 | 66.1 | 98.5 |
| 31 | 1:3:1 | ¼ | 74.9 | 100 | 63.8 | 98.9 |

The reaction temperature is 80°, except run 31 where it is 80–90°.

The composition of the phenylated reaction products is:

| | Composition of Matter in Percent | | |
|---|---|---|---|
| | PhP(S)Cl₂ | Ph₂P(S)Cl | Ph₃PS |
| Example No.: | | | |
| 29 | 28.8 | 61.7 | 9.5 |
| 30 | 50.0 | 43.5 | 6.5 |
| 31 | 46.6 | 44.7 | 8.7 |

TABLE 4

| | Molar ratio, P(S)Cl₃:AlCl₃:C₆H₆ | Time, hrs. | Yield in percent calculated on— | | Conversion in percent calculated on— | |
|---|---|---|---|---|---|---|
| | | | P(S)Cl₃ | C₆H₆ | P(S)Cl₃ | C₆H₆ |
| Example No.: | | | | | | |
| 32 | 1:0.15:0.25 | 4 | | 64 | | |
| 33 | 1:0.25:0.25 | 3 | 23.1 | 60 | 9.7 | |
| 34 | 1:0.25:1 | 1 | 64.6 | 81.5 | 21.7 | 44.7 |
| 35 | 1:0.25:2 | 1¼ | 56.3 | 59.5 | 21.1 | 21.5 |
| 36 | 1:0.25:4 | 1¼ | 58.9 | 61.1 | 22.3 | 11.7 |
| 37 | 1:0.33:0.25 | 2 | 25.2 | 81 | 13.8 | 81.0 |
| 38 | 1:0.5:1 | 1 | 77.7 | 100 | 49.4 | 100 |
| 39 | 1:0.5:2 | 1¼ | 63.5 | 66 | 41.8 | 43.1 |
| 40 | 1:0.5:3.2 | 2 | 82.0 | | 37.0 | |
| 41 | 1:0.5:4 | 2 | 85.4 | 87.3 | 46.2 | 24.1 |
| 42 | 1:1:0.5 | 2½ | 88.5 | 96.5 | 31.4 | 96.5 |
| 43 | 1:1:0.5 | 2½ | 89.3 | 79.3 | 22.8 | 79.3 |
| 44 | 1:2.5:0.5 | ¼ | 65.3 | 100 | 35.7 | 100 |

The reaction temperature is 80°, except runs 6 and 11 where it is 125°. Per mole of thiophosphorus chloride are added 100 ml. of hexane in runs 1 and 2, and 200 ml. of hexane in run 12.

The composition of the phenylated reaction products is:

| | Composition of Matter in Percent | | |
|---|---|---|---|
| | PhP(S)Cl₂ | Ph₂P(S)Cl | Ph₃PS |
| Example No.: | | | |
| 32 | 18.5 | 81.5 | |
| 33 | 40.9 | 59.1 | |
| 34 | 4.8 | 80.2 | 15.1 |
| 35 | 5.0 | 82.6 | 12.4 |
| 36 | 1.7 | 83.7 | 14.6 |
| 37 | 55.2 | 34.2 | 10.6 |
| 38 | 5.3 | 83.4 | 11.3 |
| 39 | 3.7 | 82.5 | 13.8 |
| 40 | 54.9 | 42.6 | 2.5 |
| 41 | 1.4 | 86.0 | 12.7 |
| 42 | 54.1 | 28.3 | 17.6 |
| 43 | 27.4 | 65.4 | 7.2 |
| 44 | 60 | 16 | 24 |

EXAMPLE 45

A mixture consisting of 12.7 g. (0.075 mole) of thiophosphorus chloride, 53 g. (0.4 mole) of aluminum chloride and 48 g. (0.5 mole) of fluorobenzene is refluxed for 4 hours. Then, it is proceeded as in Example 4. The fractional distillation yields:

(1) 17.2 g.(=79.5%) of $(FC_6H_4)_2P(S)Cl$; B.P. 122–127° C./0.08 mm. The product solidifies completely at room temperature and melts at 51–52° C., chemical shift (undercooled melt) −77.7 p.p.m.

*Analysis.*—Calc. for $C_{12}H_8ClF_2PS$ (288.7), percent: C, 49.92; H, 2.79. Found, percent: C, 50.53; H, 2.94.

The infrared spectrum makes evident that the compound is the para isomer, containing a trace of the ortho isomer.

(2) 2 g. of a residue.

EXAMPLE 46

A mixture consisting of 50.7 g. (0.3 mole) of thiophosphorus chloride, 88.6 g. (0.66 mole) of aluminum chloride and 32 g. (0.33 mole) of fluorobenzene is refluxed for 1¾ hours. Then, it is proceeded as in Example 4. The fractional distillation yields:

(1) 26.6 g.(=35.2%) of $FC_6H_4P(S)Cl_2$; B.P. 56–58° C./0.04 mm., $n_D^{20}$ 1.5989, chemical shift −73.1 p.p.m.

*Analysis.*—Calc. for $C_6H_4Cl_2FPS$ (229), percent: C, 31.46; H, 1.76. Found, percent: C, 32.42; H, 1.84.

The infrared spectrum makes evident that the compound is the para isomer, containing a trace of the ortho isomer.

(2) 15.1 g.(=14.2%) of $(FC_6H_4)_2P(S)Cl$; B.P. 98–120° C./0.01 mm.

(3) 12.3 g. of a brown residue.

What is claimed is:

1. In a process for preparing arylated thiophosphorus compounds of the formula $Ar_mR_nP(S)X_{3-m-n}$ wherein Ar is an aromatic hydrocarbon radical which can contain substituents inert to a Friedel-Crafts catalyst, R is a hydrocarbon radical which can contain substituents inert to aluminum chloride, X is selected from the class consisting of bromine and chlorine atoms, $m$ is an integer from 1 to 3, and $n$ is an integer from 0 to 2, by reacting at a temperature at which hydrogen halide is given off and in the presence of a Friedel-Crafts catalyst, a thiophosphorus halide compound of the formula $R_nP(S)X_{3-n}$ wherein R, $n$ and X are as defined hereinabove, with an aromatic compound of the formula ArH wherein Ar is as defined hereinabove, the improvement wherein there is used at least an equimolar amount of catalyst with respect to the thiophosphorus halide compound to be reacted and at least an equimolar amount of the aromatic compound based on the halogen atoms to be replaced.

2. A process of claim 1 wherein the catalyst complex compound is decomposed and then the arylated thiophosphorus end product is separated from the reaction mixture.

3. A process of claim 2 wherein the catalyst complex compound is decomposed by an agent selected from the group consisting of water, ice and mixtures thereof.

4. A process of claim 1 wherein the catalyst is aluminum chloride which is reacted in the presence of thiophosphorus chloride.

5. A process of claim 1 wherein the catalyst is aluminum bromide which is reacted in the presence of thiophosphorus bromide.

6. A process of claim 1 wherein Ar is selected from the class consisting of aromatic hydrocarbon and halogenated-aromatic hydrocarbon having not more than 25 carbon atoms and free of non-benzenoid unsaturation, and R is selected from the class consisting of hydrocarbon and halogenated hydracrbon having not more than 25 carbon atoms and free of non-benzenoid unsaturation.

7. A process of claim 6 wherein Ar and R each have not more than 8 carbon atoms.

8. A process of claim 1 for preparing triarylphosphine sulfide wherein the phosphorus halide is $P(S)Cl_3$ and there is used with respect to the thiophosphorus chloride to be reacted at least three times equimolar quantity of catalyst which is aluminum chloride.

9. A process of claim 1 for preparing diarylthiophosphinic halides wherein the thiophosphorus halide is $P(S)Cl_3$ and there is used with respect to the thiophosphorus chloride to be reacted at least an equimolar quantity of the catalyst which is aluminum chloride.

10. A process of claim 1 for preparing arylthiophosphonic dihalides wherein the thiophosphorus chloride is $P(S)Cl_3$, there is used with respect to the thiophosphorus chloride to be reacted at least equimolar quantity of the catalyst which is aluminum chloride, and not more than about an equimolar quantity of the aromatic compound reactant.

11. A process of claim 1 for preparing triorganophosphine sulfides wherein there is employed with respect to the thiophosphorus halide compound to be reacted which has the formula $RP(S)X_2$ wherein R and X are as defined in claim 1, at least double equimolar quantity of catalyst which is aluminum chloride.

12. A process of claim 1 for preparing triorganophosphine sulfides wherein there is employed with respect to the thiophosphorus halide compound to be reacted which is of the formula $R_2P(S)X$ wherein R and X are as defined in claim 1, at least an equimolar quantity of catalyst which is aluminum chloride.

13. A process of claim 1 for preparing diorganothiophosphinic halides wherein there is employed with respect to the thiophosphorus halide compound to be reacted and having the formula $RP(S)X_2$ wherein R and X are as defined in claim 1, at least an equimolar quantity of the catalyst which is aluminum chloride.

14. A process of claim 1 wherein the catalyst is ethylaluminum dichloride which is reacted in the presence of thiophosphorus chloride.

15. A process of claim 1 wherein Ar is phenyl, $n$ is 0, X is Cl, and the catalyst is aluminum chloride.

16. A process of claim 1 wherein Ar is tolyl, $n$ is 0, X is Cl, and the catalyst is aluminum chloride.

17. A process of claim 1 wherein Ar is chlorophenyl, $n$ is 0, X is Cl, and the catalyst is aluminum chloride.

18. A process of claim 1 wherein Ar is hexyltolyl, $n$ is 0, X is Cl, and the catalyst is aluminum chloride.

19. A process of claim 1 wherein Ar is phenyl, $n$ is 0, X is Br, and the catalyst is aluminum bromide.

References Cited

UNITED STATES PATENTS 3,053,900   9/1962   Harwood et al. ___ 260—543 XR
3,305,589   2/1967   Bacon.

OTHER REFERENCES

Cosolapoff: Organophosphorus Compounds, p. 65 (1950).

Michaelis: Amalen, vol. 315, pp. 64–65 (1901).

LORRAINE A. WEINBERGER, Primary Examiner

E. J. GLEIMAN, Assistant Examiner

U.S. Cl. X.R.

260—606.5

PO-1050
(5/69)

UNITED STATES PATENT OFFICE
CERTIFICATE OF CORRECTION

Patent No. 3,504,025             Dated March 31, 1970

Inventor(s) Ludwig Maier

It is certified that error appears in the above-identified patent and that said Letters Patent are hereby corrected as shown below:

Column 3, line 23, "sulfied." should be -- sulfide. --

Column 3, line 40, "Lockhart, J.," should be -- Lockhart, Jr., --

Column 5, line 34, before "added." should be inserted -- is --

Column 6, line 18, "($C_{12}H_{10}$ClPS" should be -- $C_{12}H_{10}$ClPS --

Column 7, line 70, "$C_{17}H_{12}Cl_3PS$" should be -- $C_{18}H_{12}Cl_3PS$ --

Column 12, line 57, "hydracrbon" should be -- hydrocarbon --

SIGNED AND
SEALED
JAN 5 1971

(SEAL)
Attest:

Edward M. Fletcher, Jr.
Attesting Officer

WILLIAM E. SCHUYLER, JR.
Commissioner of Patents